Aug. 7, 1962    E. R. FERRARI    3,048,207
CARBIDE TIPS FOR SAWS
Filed Oct. 5, 1959
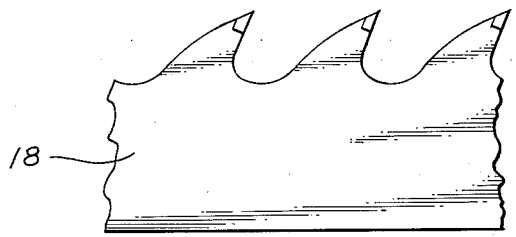
Fig. 1.
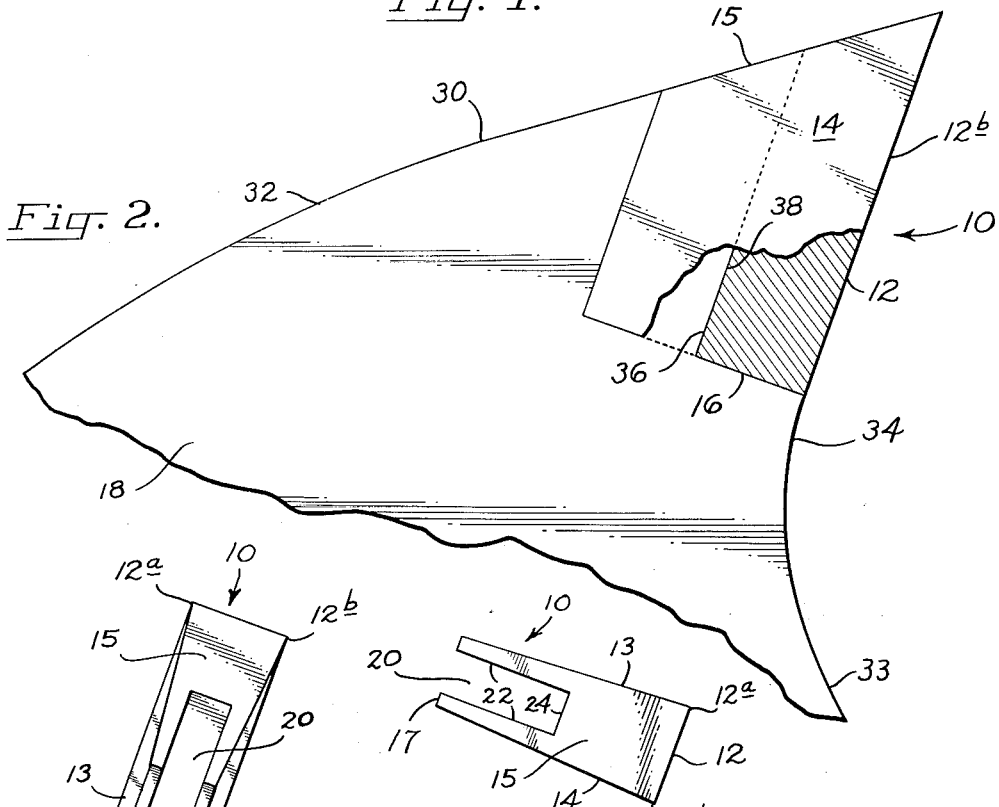
Fig. 2.
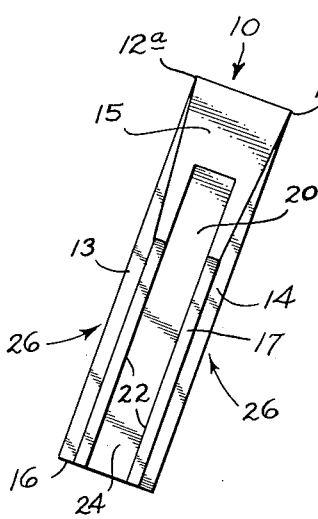
Fig. 3.
Fig. 4.
Ernest R. Ferrari
INVENTOR.
BY Ramsey and Kolisch
Attys.

3,048,207
CARBIDE TIPS FOR SAWS
Ernest R. Ferrari, P.O. Box 788, Vancouver, Wash., assignor of 33⅓ percent to Howard G. Jacobsen and 33⅓ percent to Vera I. La Fountaine, both of Portland, Oreg.
Filed Oct. 5, 1959, Ser. No. 844,443
1 Claim. (Cl. 143—133)

This invention relates to improvements in carbide and dense alloy tips for the teeth of saws.

A procedure followed in the manufacture of saws is to provide the teeth of the saws with tips of carbide and the like. The tips are capable of retaining sharpened edges for longer periods of time than ordinary saw teeth. Saws so equipped may be operated at higher speeds and with less shut down time than saws comprised entirely of the steel alloy making up the blade of the saw. A carbide tip, however, tends to be brittle rather than ductile, and problems arise in suitably securing the tip to a saw tooth whereby the tip will remain in place without skewing or breaking off.

In general terms, the tip of this invention is adapted to be mounted on the outermost end of a saw tooth and be secured in fixed position thereon. The tip comprises a body shaped as a pyramidal frustum. The base of the body constitutes the front face of the tip. The tip is slotted midway between its sides by a slot that projects into the body from the rear of the body. The slot occupies a plane normal to the front face. Thus the tip has a U-shaped cross section, and has legs defined by the slot that straddle a saw tooth when the tip is mounted on a saw. A tooth that is to receive the tip is notched at its outer end, enabling the front face of the tip to lie substantially flush with the forward edge of the tooth that is the continuation of the gullet between adjacent teeth in a saw.

A number of advantages result from the form of construction for the tip just briefly outlined. The legs on either side of the tip, by straddling the saw tooth, impart rigidity to the mounting for the tip. The legs not only provide an extended and rigid support along opposite faces of a tooth that inhibits skewing of the tip, but also provide expansive surfaces for brazing the tip to the saw tooth. The sides of the pyramidal-shaped tip bear equally upon the sides of the saw tooth, and provide a backing of carbide joined to the tooth of the saw for the front face of the tip.

According to an embodiment of this invention, the carbide tip is preformed, with the slot that receives the end of a saw tooth in predetermined position relative to the side cutting edges of the front face of the tip (these edges defining the lateral sides of the front face). By preforming the tips in a critical manner, a series of tips may be mounted on a saw with the side edges of the tips occupying a correct aligned position without having subsequently to sharpen the side edges. After mounting of a tip, all that need usually be done is to grind the back of the tip. In the past, no effort has been made to profile or shape the front face of a carbide tip, and shaping of the tip has been done by grinding the same after it has been brazed to a saw tooth. Such grinding is difficult and expensive to perform. Furthermore, it makes replacement of a tip difficult, since the sides of each new tip must be ground to bring them into alignment with the sides of adjacent tips.

In band saws, grinding of individual tips to shape them when they are mounted on the saw with the saw unstressed ignores the transverse bowing that normally exists in the band saw prior to stressing. Thus when the saw is stressed during use and the curvature is removed, the positions of the saw teeth and tips change. Relatively large forces commonly are required to flatten a band saw by stressing it, and since ordinarily grinding is done by lightweight grinders, flattening out the saw during sharpening is impractical if not impossible. Thus efforts to apply a carbide tip to a band saw have been impractical where uniform width of faces is important.

According to this invention, the tip is preformed so that the slot in the tip is made to conform to a given gauge of saw, and the slot is exactly midway between the sides of the tip. For example, in a twelve-gauge saw (which is about 0.109 inch in width), a tip on the end of the saw ordinarily may cut a kerf up to about 0.203 inch or so in width. In the example given, the slot may have a width only slightly exceeding the width of the saw (the extra width receiving brazing material), and the preformed face is provided with side edges separated exactly to the width of the kerf desired. After mounting of a tip no further attention need be given to the side edges of the tip, and should the tip be replaced, grinding of the side edge of a new tip is unnecessary.

Other objects and advantages are attained by the invention, which is described hereinbelow in conjunction with the accompanying drawings, wherein:

FIG. 1 illustrates a section of a band saw with the tips of this invention mounted thereon;

FIG. 2 is an enlarged view of a tooth of the band saw and the tip;

FIG. 3 illustrates the rear end of the tip proper; and

FIG. 4 is a top view of the tip in FIG. 3.

Referring now to the drawings, 10 indicates generally the body of the tip of the invention, which may be made of tungsten carbide or other dense alloy material. The body of the tip has a pyramidal frustum shape defined by a rectangular base constantly forming face edge 12, sides 13, 14, top edge 15, base edge 16 and a back edge 17. When the tip is mounted on a saw blade 18, base 12 constitutes the face of the tip and leads the saw tooth mounting the tip on movement of the saw. Sides 13 and 14 form the two side faces for the tip, and edges 15 and 16 spanning the distance between sides 13 and 14 form the back edge 16 and base edge of the tip, respectively. Side faces 13 and 14 slope rearwardly from opposed corners 12a, b of the forward edge 12 at acute angles. Top edge 15 also slopes rearwardly of forward edge 12 at an acute angle, and base edge 16 extends normal to the forward edge.

Indented into body 10 and disposed in a plane that is normal to the plane of edge 12 is a slot 20. This constitutes means for seating the tip in predetermined position on a tooth. The slot has a rectangular cross section, as seen in FIG. 4, and is defined by sidewalls 22 and a vertical surface 24, the latter lying in a plane parallel to forward edge 12. The slot opens to the top edge 15 and base edge 16. Slot 20 is adapted to receive end portions of a saw blade tooth and is midway between side faces 13 and 14 and corners 12a, 12b. The slot has a width substantially equal to but slightly greater than the gauge of the saw blade. By reason of slot 20, tip 10 has a U-shaped cross section with legs 26 defining an inner space in the tip of a width conforming substantially to the gauge of the saw.

A saw tooth that receives the tip is indicated in FIG. 2 at 30. The tooth has a back edge 32 and a forward edge 34 alined with tip face 12 to define the usual gullet 33 between successive teeth. A notch 36 is indented into the forward edge of tooth 30. The notch is configured so that when the tip is placed on the saw tooth, forward edge 12 is alined with the forward edge 34 of the tooth and forms a continuation of the edge. Top edge 15 that constitutes the back of the tip is substantially continuous of back edge 32. Vertical surface 24 of slot 20 is parallel with face 12 and abuts an edge 38 of notch 36. Thus, in use, the tip is lodged squarely against edge 38.

With the tip mounted on the end of a saw tooth, legs 26 defined by the slot straddle the tooth and have inner faces overlying opposite faces of the saw tooth. As mentioned above, the slot that receives the tooth is made slightly wider than the actual width of the tooth. This extra width accommodates brazing material. Thus the tip may be brazed over a large area to the saw blade tooth, and firm securement results. The legs of the tip by straddling the tooth inhibit skewing of the tip, and also provide a backing of carbide material for the front face as it moves through wood in making a kerf.

The tips preferably are preformed, with the corners 12a, 12b (the cutting corners) equally symmetrical with slot 20 and spaced apart a distance exactly corresponding to the width of kerf to be produced. Thus the side faces need not be ground after placement of the tip on a saw tooth. With a band saw, a series of the tips may be mounted on successive teeth with the band saw unstressed. The tips, before stressing of the saw, because of the usual transverse bowing or tensioning of the saw occupy a position deviating slightly from alignment. Subsequently on stressing the band saw, the tips move into mutually aligned position, and with the side cutting edge of the tips respectively, alined and centered with the gauge of the saw blade. Of course, the tips of the invention may be used in saws other than band saws, such as circular saws and the like.

It is claimed and desired to secure by Letters Patent:

In a saw, the combination of a saw tooth having a back edge, a forward edge and a forward outer end and a preformed tip of carbide and the like secured to said forward outer end in fixed position thereon, said tip having a face at the front thereof that leads the tooth on movement of the saw, a slot at the rear thereof extending inwardly into the tip that receives the end of the saw tooth, a top that joins smoothly with the back of the saw tooth, and sides that partially overlie the side faces of the saw tooth, said slot being approximately midway between said sides, said saw tooth having a notch formed therein in the forward edge at the forward outer end of the tooth receiving the tip and enabling the tip to be set on the saw tooth with said front face substantially flush with the forward edge of the saw tooth.

References Cited in the file of this patent

UNITED STATES PATENTS

| 561,079 | Atkins | June 2, 1896 |
| 2,714,317 | Drake | Aug. 2, 1955 |

FOREIGN PATENTS

| 617,615 | Germany | Aug. 22, 1935 |